Figure 1:
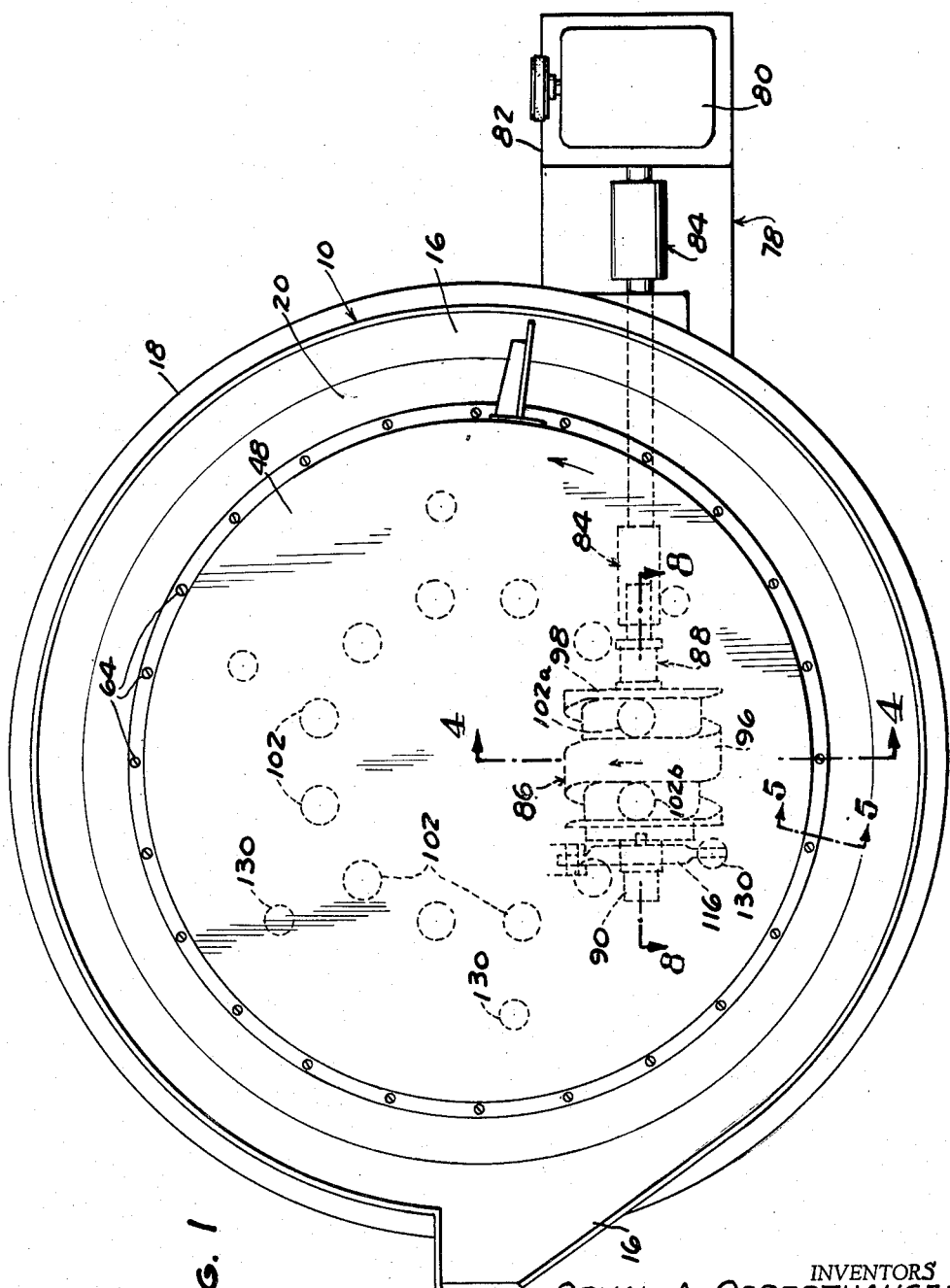

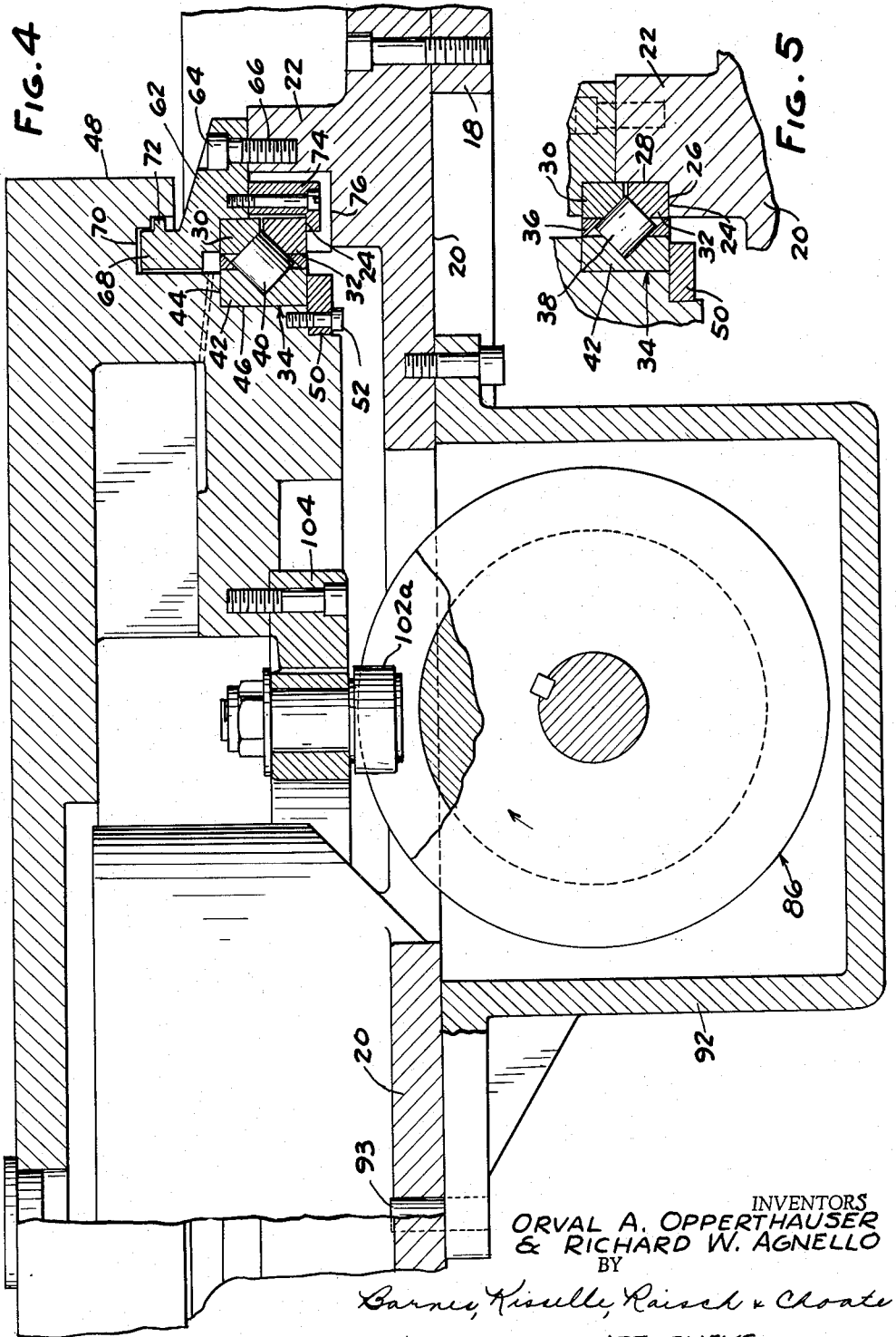

Oct. 20, 1964   O. A. OPPERTHAUSER ETAL   3,153,355
INDEX TABLE
Filed Oct. 9, 1961   6 Sheets-Sheet 4
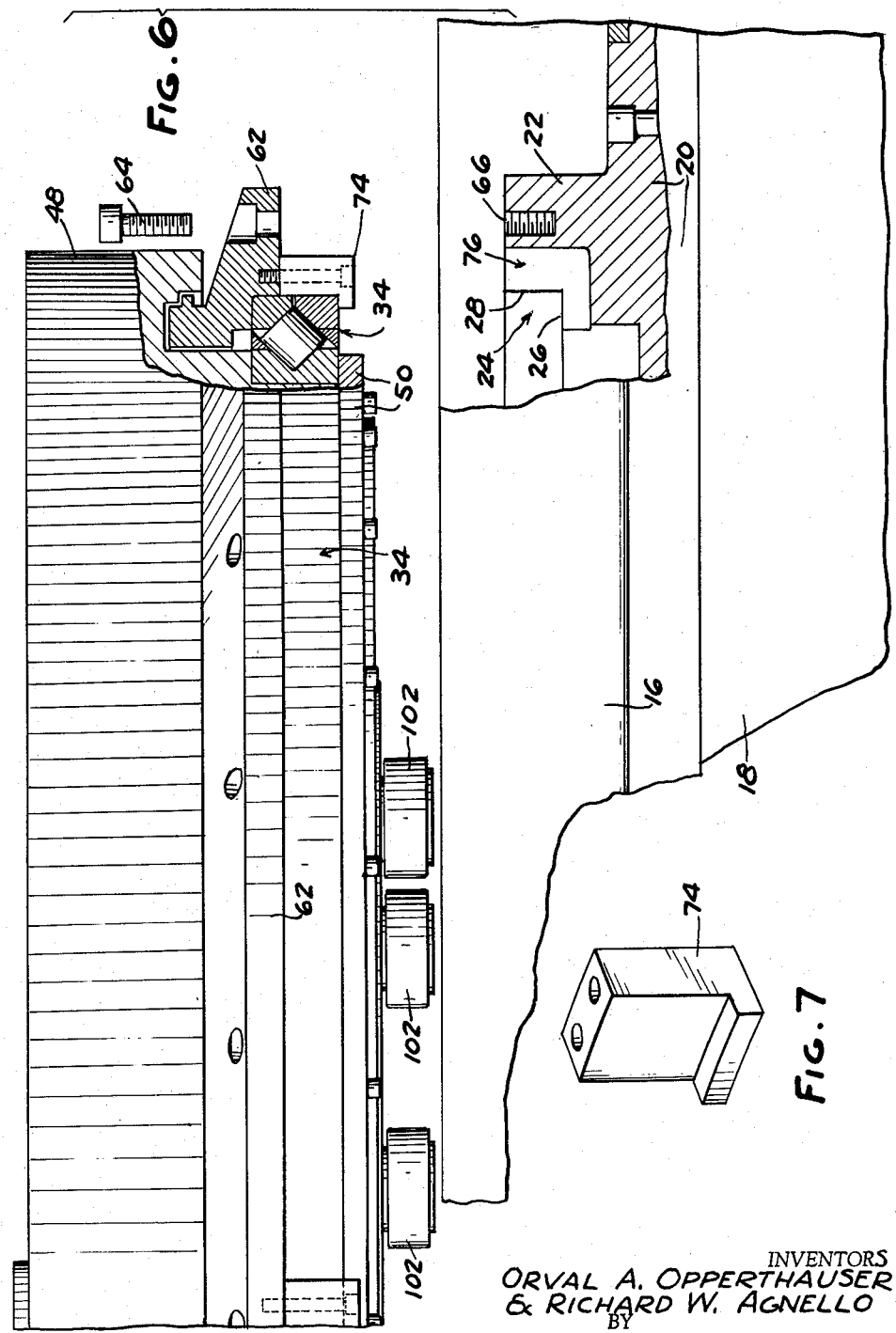
INVENTORS
ORVAL A. OPPERTHAUSER
& RICHARD W. AGNELLO
BY
Barnes, Kisselle, Raisch & Choate
ATTORNEYS

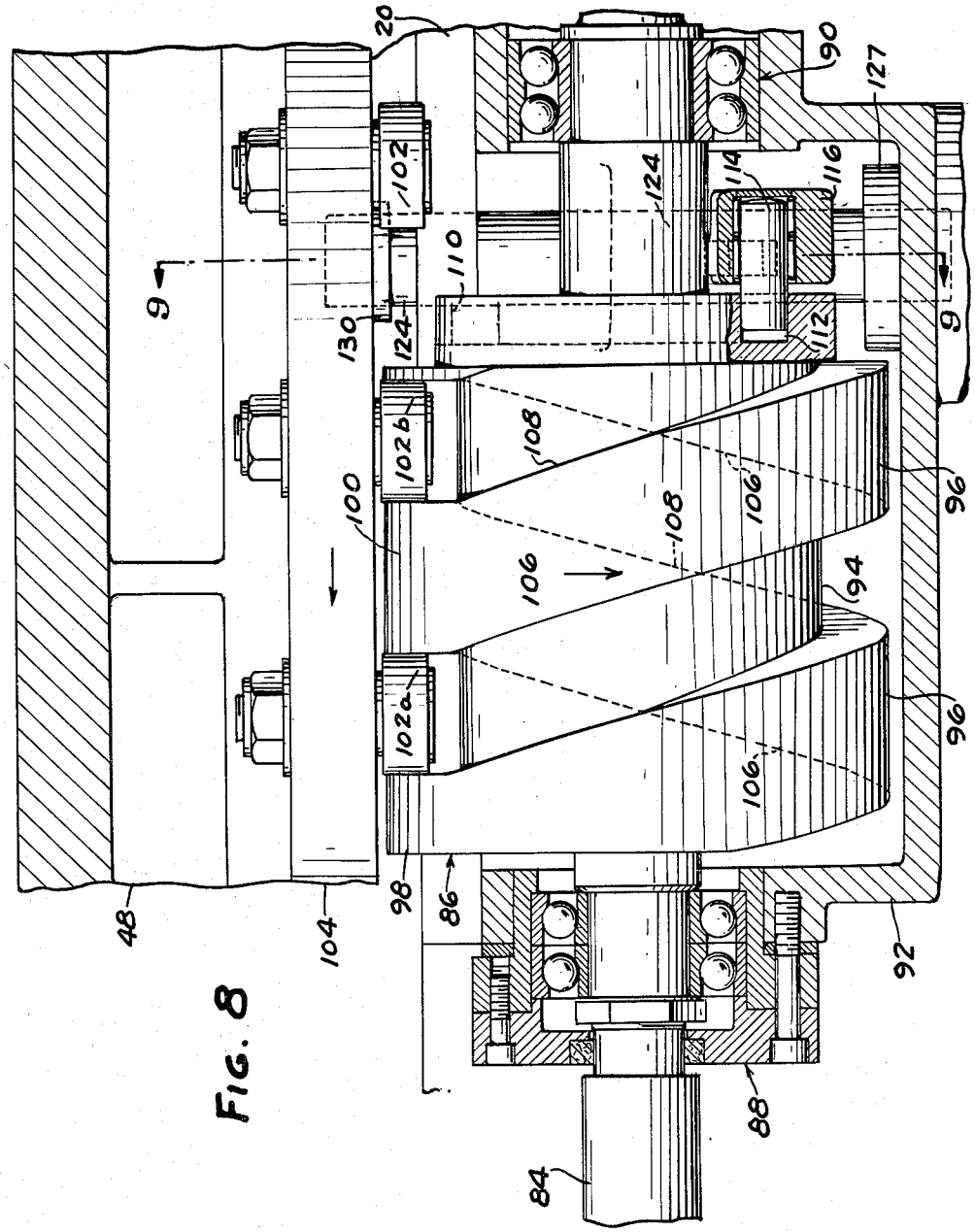

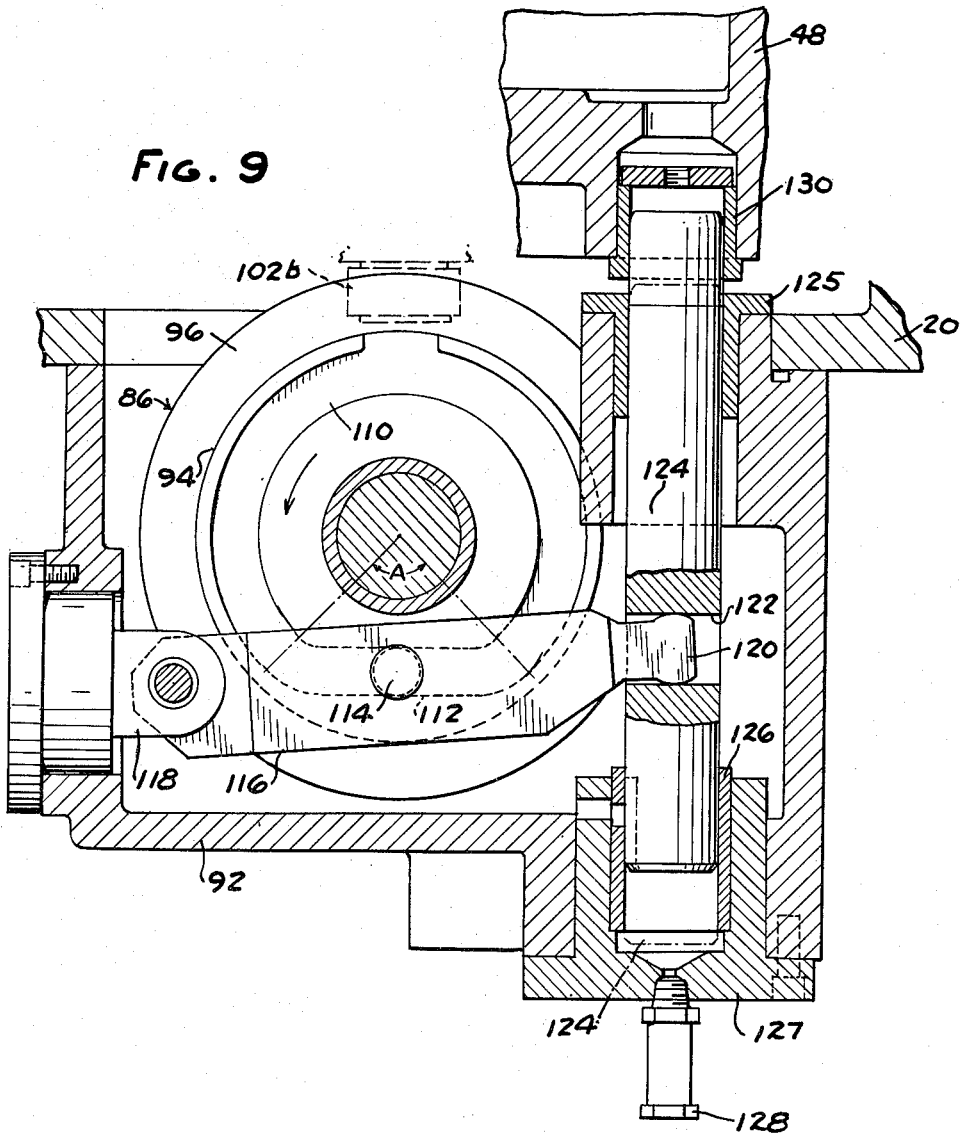

United States Patent Office 3,153,355
Patented Oct. 20, 1964

3,153,355
INDEX TABLE
Orval A. Opperthauser, Bloomfield Township, Oakland County, and Richard W. Agnello, Detroit, Mich., assignors to F. Joseph Lamb Co., Detroit, Mich., a corporation of Michigan
Filed Oct. 9, 1961, Ser. No. 143,965
6 Claims. (Cl. 77—64)

This invention relates to machines of the rotary indexing type, and more particularly to an improved index table assembly for supporting a multiplicity of workpieces which are successively indexed by the table from one work station to another.

Horizontal index tables are known which utilize a ball type bearing around the periphery of the table to partially support the weight of the table and workpieces as well as the axial forces of the work operation. However, as far as is known such index tables also rely on a centural bearing structure to support the table against radial thrust loads. In order to accommodate the central bearing structure in the table support structure of larger machines, it is necessary to provide a floor pit to receive the table support structure so that the workpieces are maintained at a convenient level above the floor for operating and service personnel.

Accordingly, it is an object of the present invention to provide an improved indexing table in which the central bearing structure is eliminated to provide a table and support structure of minimum overall height.

Indexing machines of the character described are usually costly, precise mechanisms which include various internal parts which are subjected to heavy forces and considerable wear so that servicing is periodically required to maintain the accuracy of the mechanism.

Accordingly, it is another object of the present invention to provide an index table which is serviceable with a minimum of time and effort.

It is often desirable to be able to perform operations on the workpieces from a point radially inward as well as points radially outward of the workpieces, and for this purpose a center column support for machine tools is conventionally provided for mounting the tools radially inward or above the workpieces.

It is therefore a further object of the present invention to provide an index table mechanism which is readily adapted to support a center column machine tool support directly on the base of the index table, thereby eliminating the necessity for support structures and additional foundation structures located independently of the indexing table.

One prime requirement of an indexing mechanism is its ability to provide accurate alignment of the table after each indexing movement, which in turn requires accurate synchronization of the table locking pin mechanism with the table drive mechanism.

Still another object of the present invention is to provide a drive mechanism for indexing the table which also actuates the indexing pin so that the table indexing drive and locking pin cannot get out of time.

Figure 2:
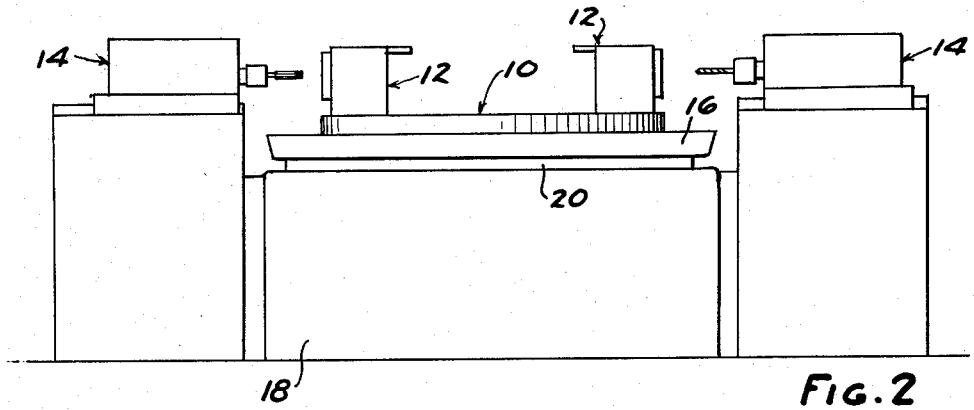
Figure 3:
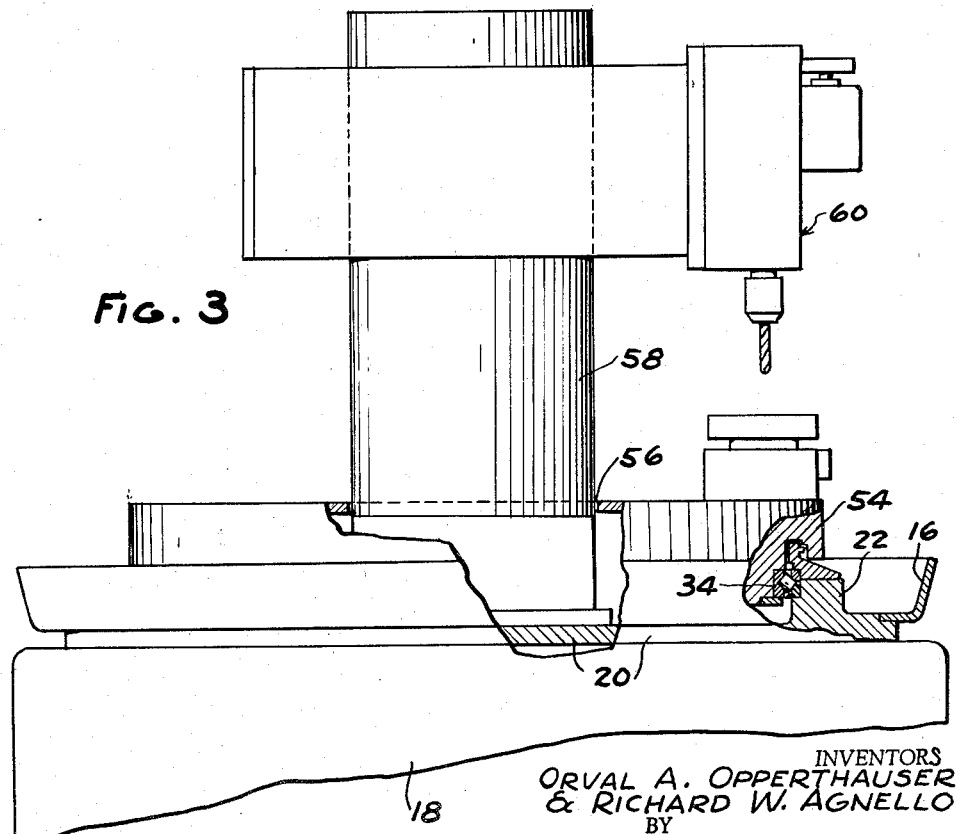

In the accompanying drawings:
FIG. 1 is a plan view of the index table assembly of the present invention.
FIG. 2 is an elevational view of the index table assembly illustrating the mounting of work fixtures thereon opposite machine tool stations located radially outward of the index table.
FIG. 3 is a fragmentary elevational view of an index table assembly of the invention as modified to support a center column machine tool support, with portions being broken away to illustrate details.
FIG. 4 is a sectional view taken on the line 4—4 of FIG. 1.
FIG. 5 is a fragmentary sectional view taken on the line 5—5 of FIG. 1.
FIG. 6 is an exploded fragmentary elevational view of the index table assembly of FIG. 1 illustrating the removal of the index table from the base of the assembly, with portions being broken away to illustrate details.
FIG. 7 is a perspective view of a support bracket for a bearing sub-assembly of the index table assembly.
FIG. 8 is a sectional view taken on the line 8—8 of FIG 1.
FIG. 9 is a sectional view taken on the line 9—9 of FIG. 8.

Referring in more detail to the accompanying drawings, FIG. 2 shows a rotary index table assembly 10 with work holding fixtures 12 mounted thereon, the index table assembly being operable to advance the fixtures successively in a circular path to a plurality of conventional machine tools 14 arranged around the table. Index table assembly 10 includes the usual peripheral chip and coolant receiving tray 16. Although table assembly 10 is shown mounted on a stationary horizontal machine base 18 for rotation relative thereto about a vertical axis, it may be used in other positions as desired.

Referring to FIGS. 1 and 4–6, index table assembly 10 comprises a circular cast iron base 20 which is bolted on the machine base 18. An annular upright integral flange 22 extends around the periphery of table base 20 which has an internal circumferential groove 24 with accurately machined horizontal and vertical surfaces 26 and 28 (FIGS. 5 and 6). These machined radial and axial surfaces 26 and 28 serve to accurately located and support the outer annular races 30 and 32 of a conventional X type roller bearing assembly 34. Bearing assembly 34 also includes an annular cage ring 36 which supports a series of bearing rollers 38 and 40 which are supported for rolling engagement between outer races 30, 32 and an annular inner race 42. Bearing rollers 38 and 40 alternate with one another around the circumference of bearing assembly 34 and have their respective axes of rotation disposed 90 degrees from one another and 45 degrees from the axis of rotation of the bearing assembly to support both radial and axial thrust loads. Inner race 42 is received in accurately machined horizontal and vertical surfaces 44 and 46 of an annular groove formed in a circular cast iron index table 48. A retaining ring 50 is detachably mounted by cap screws 52 on the underside of table 48 to clamp inner race 42 in the groove of table 48.

It is to be understood that bearing assembly 34 may also comprise a conventional ball bearing in lieu of an X bearing, but in either case it provides the sole supporting interconnection between base 20 and index table 48 while providing an anti-friction coupling which rotatably supports table 48 to withstand loading from all directions. Also, due to this manner of mounting table 48 on base 20, the accuracy with which table 48 is located relative to the machine base 18 depends only on the accuracy of table bearing support surfaces 44, 46 and base bearing support surfaces 26, 28.

A further advantage of the above table-to-base mounting is illustrated by the modified index table 54 illustrated in FIG. 3. Index table 54 is similar to index table 48 except that a central opening 56 is provided in table 54 through which extends a vertical center column 58 which is mounted at its lower end on stationary base 20. Center column 58 is adapted to support a plurality of machine tools 60 above table 54 in a conventional manner. The absence of bearing or interconnecting structures in the center of the index table thus permits the use of the index table assembly in either of the machine tool set-ups exemplified in FIGS. 2 and 3, or in a combined vertical and radial setup. Moreover the machine base 18 need only be of sufficient height, such as 18 to 24 inches, to provide adequate supporting mass for the machine tools and work operations.

The interior of index table assembly 10 is sealed against dust, dirt, chips and liquid coolants by the provision of an annular sealing ring 62 (FIGS. 4 and 6) which is mounted by a series of circumferentially spaced cap screws 64 threadably received in holes 66 provided in flange 22 of base 20. Mounting screws 64 are disposed radially outward of the periphery of index table 48 for ease of access (FIG. 1). Sealing ring 62 includes an upright flange 68 which runs around the inner periphery thereof and which is received in a mating recess 70 provided on the underside of table 48. Flange 68 has an annular lip 72 which in co-operation with the corresponding contour of table recess 70 provides a tortuous path to the interior of the table assembly to prevent ingress of chips or other undesirable waste material. Sealing ring 62 is clamped to bearing assembly 34 by four clamping blocks 74 (FIGS. 4 and 7) disposed at 90 degree intervals around the ring, table base 20 being provided with suitable recesses 76 which accommodate clamping blocks 74 (FIGS. 4 and 6).

As illustrated in FIG. 6, the above mounting of sealing ring 62 facilitates disassembly of index table assembly 10. When it is desired to service the internal parts of the table assembly, such as the bushings and shot pin described subsequently, it is only necessary to remove retaining screws 64, whereupon table 48 with sealing ring 62 and bearing assembly 34 attached thereto may be lifted bodily as a unit from base 20 and without having to remove fixtures 12 from table 48.

It is to be understood that these results are likewise obtainable by making outer races 30 and 32 in one piece for use with a split inner race 42, or, if desired, by making outer races 30 and 32 and sealing ring 62 all in one piece.

Referring to FIG. 1 the drive mechanism for index table assembly 10 comprises a conventional power unit 78 including a motor 80, a speed reduction unit 82 and a drive shaft assembly 84. The power unit 78 drives a drum cam 86 which is journalled via ball bearing assemblies 88 and 90 (FIG. 8) in a well housing 92 bolted to the underside of table base 20 and accurately positioned relative thereto by dowels 93 (FIG. 4).

As best shown in FIGS. 1 and 8 the drum cam 86 comprises a cylindrical portion 94 having an integral rib 96 which is wound helically therearound except for a pair of straight portions 98 and 100 of the rib which extend partially around the circumference of cylinder 94 in a plane drawn radially through the rotational axis of the index table 48. The space between ribs 96 provides a cam groove adapted to successively receive a series of cam follower rollers 102, one pair at a time. Rollers 102 are journalled in a ring 104 which is bolted to the underside of index table 48. Two cam followers 102 are provided for each work station to be indexed, a six station table with twelve cam followers 102 being shown for purposes of illustration. Cam drum 86 is designed to index the table 48 circumferentially the distance between successive stations for each complete revolution of the drum cam. The helical or actuating portions of rib 96 produce the circumferential movement of table 48 while the straight portions 98, 100 of rib 96 provide a dwell portion which permits cam 86 to rotate without causing rotation of table 48.

The vertical side surfaces 106 and 108 of cam rib 96 are spaced axially apart the correct distance to contact a pair of leading and trailing cam follower rollers 102a and 102b (FIG. 8). Rib side surface 106 drives leading roller 102a while roller 102b rotates against surface 108 in an opposite direction from roller 102a. Thus a pair of cam rollers 102 are always in contact with drum cam rib 96, thereby eliminating surge, blacklash and shock regardless of the mass being indexed by the cam.

Another feature of the present invention is the provision of an additional cam surface on drum cam 86, preferably in the form of a continuous groove 110 recessed in one end face of drum cam 86 (FIGS. 8 and 9). Groove 110 is concentric with the rotational axis of drum cam 86 except for a straight portion 112 (FIG. 9) which extends through a segmental angle A equal to the segmental angle encompassed by straight portions 98, 100 of the circumferential cam rib 96. Cam groove 110, 112 receives a cam follower roller 114 journalled in the center of a lever 116 which is pivotably mounted at one end in a removable plug mounting bracket 118 supported by well housing 92. The other end of lever 116 has an integral driving head 120 slidably received in a radial slot 122 of a cylindrical shot pin 124. Shot pin 124 is slidably supported in upper and lower bushings 125 and 126 precision located in well housing 92. A removable plug 127 supports bushing 126 as well as a check valve 128, thereby permitting easy removal of shot pin 124 by first withdrawing plug bracket 118 to pull driving head 120 out of shot pin slot 122 and then removing plug 127.

Lever 116 causes vertical reciprocation of shot pin 124 in bushings 125, 126 between upper and lower positions thereof (indicated respectively in solid and broken lines in FIG. 9) during the portion of drum cam rotation in which cam follower 114 is tracking in the straight portion 112 of end groove 110, and in which rollers 102 are tracking against the straight portions 98, 100 of circumferential cam rib 86. Shot pin 124 is thus driven upward into hardened shot pin bushing 130 (one of which is mounted in the underside of index table 48 at each work station, FIG. 1) to accurately position the index table angularly as drum cam 86 completes one revolution. It is to be noted that the provision of the shot pin cam groove 110 integrally with drum cam 86 insures that the table indexing movement and the actuating movement of shot pin 124 cannot get out of time or sequence.

It is to be understood that shot pin bushings 130 are precision bored and accurately located in index table 48, and the same is true of shot pin bushings 125, 126 relative to base 20. When the index table mechanism is provided with the shot pin 124 to obtain precision angular location of the index positions thereof, it is preferred to relieve or recess the cam face 106 relative to the spacing between rollers 102a and 102b at the point in the straight dwell portions 98, 100 of cam rib 96 corresponding to the entrance of shot pin 124 into table bushing 130, thereby relying on shot pin 124 for final accuracy of alignment of the work with the work tools. However it is to be understood that for certain applications the drum cam 86 can be used to position the index table without the use of the shot pin.

We claim:

1. A rotary table assembly comprising a stationary base and a rotary table positioned on and over said base, said base having adjacent the upper end thereof an annular groove defined by a vertically extending surface and a horizontally extending surface, said groove opening radially inwardly and axially upwardly and being overlapped by said table, said table likewise having a groove on the underside thereof spaced radially inwardly from the groove on the base and being defined by a vertically extending surface and a horizontally extending surface, said last mentioned groove opening radially outwardly and axially downwardly, said grooves being juxtaposed in a radial direction, means journalling said table on said base and for resisting both radial and axial thrust loading on the table comprising a single bearing assembly comprising an inner race with a V-shaped groove therein, an outer race with a V-shaped groove therein and a plurality of rolling elements disposed between said races and in said grooves, said inner race having horizontally and vertically disposed faces in close coplanar engagement with the vertically and horizontally extending faces of the groove on the table, said outer race likewise having vertically and horizontally disposed surfaces in close coplanar engagement with the vertically and horizontally extending faces of the groove on the base, said rolling elements comprising a plurality of cylindrical bearing rollers having a length equal to their diameter, said rollers being alternately positioned with their rolling axes inclined at an angle of 45° to the vertical and the adjacent rollers having their axes oppositely inclined.

2. A rotary table assembly as called for in claim 1 wherein said outer race is split horizontally through the apex of the V-shaped groove therein into upper and lower half sections and including a ring on said base overlapping the upper half section of said outer race, said ring having an annular portion extending radially outwardly beyond the periphery of said table and fastening means extending through said outer annular portion of the ring and into said base.

3. A rotary table assembly as called for in claim 2 wherein the groove in said base has a plurality of axially downwardly and radially outwardly extending sockets therein, means in said sockets secured to said ring and overlapping the bottom face of the race in said last mentioned groove for securing said upper and lower half sections of the outer race to said ring.

4. A rotary table assembly as called for in claim 1 wherein said table is provided with a vertically extending centrally disposed aperture therethrough, said base including an integral supporting surface disposed below the central aperture in the table and an upright column member extending upwardly through said central aperture and fixedly mounted on said supporting surface.

5. A rotary table assembly comprising a stationary base and a rotary table positioned on and over said base, said base having adjacent the upper end thereof an annular groove defined by a vertically extending surface and a horizontally extending surface, said groove opening radially and axially upwardly and being overlapped by said table, said table likewise having a groove on the underside thereof spaced radially from the groove on the base and being defined by a vertically extending surface and a horizontally extending surface, said last-mentioned groove opening radially and axially downwardly, said grooves being juxtaposed in a radial direction, means journalling said table on said base and serving as the sole support for said table consisting of a single bearing assembly having an inner race, an outer race and a plurality of rolling elements arranged between said races to support both radial and axial loading on the table, one of said races having horizontally and vertically disposed faces in close coplanar engagement with the vertically and horizontally extending faces of the groove on the table, the other of said races likewise having vertically and horizontally disposed surfaces in close coplanar engagement with the vertically and horizontally extending faces of the groove on the base.

6. A rotary table assembly comprising a stationary base and a rotary table positioned on and over said base, said base having adjacent the upper end thereof an annular groove defined by a vertically extending surface and a horizontally extending surface, said groove opening radially inwardly and axially upwardly and being overlapped by said table, said table likewise having a groove on the underside thereof spaced radially inwardly from the groove on the base and being defined by a vertically extending surface and a horizontally extending surface, said last mentioned groove opening radially outwardly and axially downwardly, said grooves being juxtaposed in a radial direction, means journalling said table on said base for resisting both radial and axial thrust loading on the table and serving as the sole support for said table consisting of a single bearing assembly comprising an inner race with a bearing roller groove therein, an outer race with a bearing roller groove therein and a plurality of rolling elements disposed between said races and in said bearing roller grooves, said inner race having horizontally and vertically disposed faces in close coplanar engagement with the vertically and horizontally extending faces of the groove on the table, said outer race likewise having vertically and horizontally disposed surfaces in close coplanar engagement with the vertically and horizontally extending faces of the groove on the base, said rolling elements comprising a plurality of cylindrical bearing rollers alternately positioned with their rolling axes inclined at an angle of 45° to the vertical and the adjacent rollers having their axes oppositely inclined.

References Cited in the file of this patent

UNITED STATES PATENTS

| | | |
|---|---|---|
| 1,920,609 | Timbs et al. | Aug. 1, 1933 |
| 1,967,689 | Schauer et al. | July 24, 1934 |
| 2,358,389 | Ewart et al. | Sept. 19, 1944 |
| 2,613,428 | Lee | Oct. 14, 1952 |
| 2,622,487 | Schultz | Dec. 23, 1952 |
| 2,680,658 | Addison | June 8, 1954 |
| 2,857,787 | Natalis | Oct. 28, 1958 |
| 3,012,454 | Brodbeck | Dec. 12, 1961 |

FOREIGN PATENTS

| | | |
|---|---|---|
| 2,234,987 | France | May 23, 1960 |